Oct. 12, 1948.  W. L. HANSEN ET AL  2,450,955
SYNCHRONOUS MOTOR

Filed July 31, 1947  2 Sheets-Sheet 1

INVENTORS
WILLIAM L. HANSEN,
IRA N. HURST,
BY
Toulmin & Toulmin
ATTORNEYS

Oct. 12, 1948.  W. L. HANSEN ET AL  2,450,955
SYNCHRONOUS MOTOR
Filed July 31, 1947  2 Sheets-Sheet 2
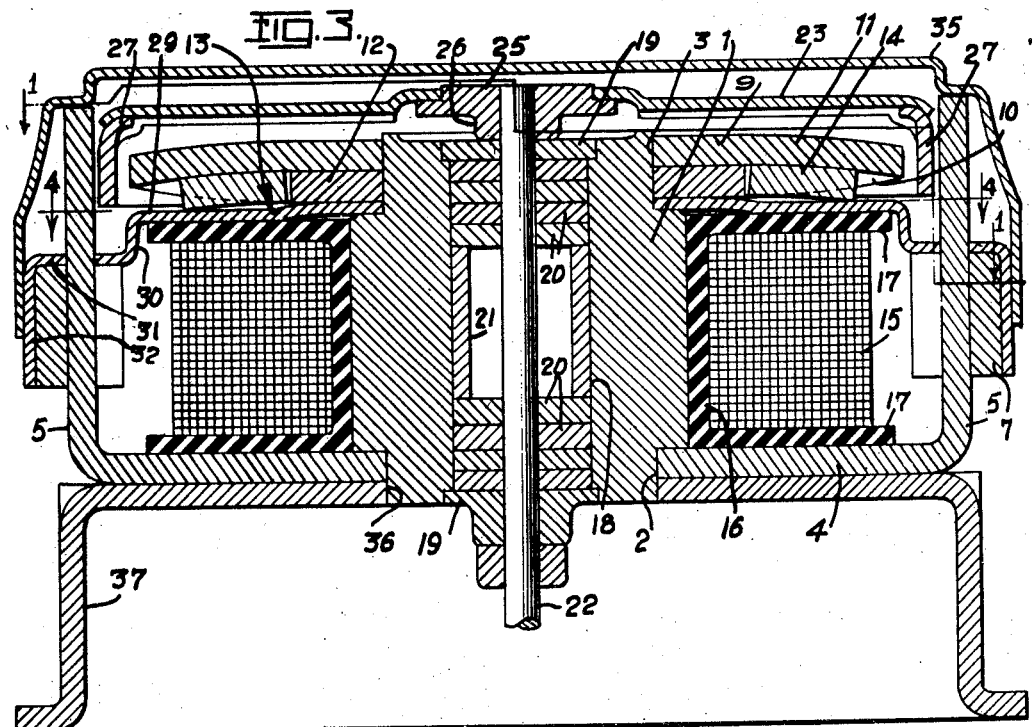
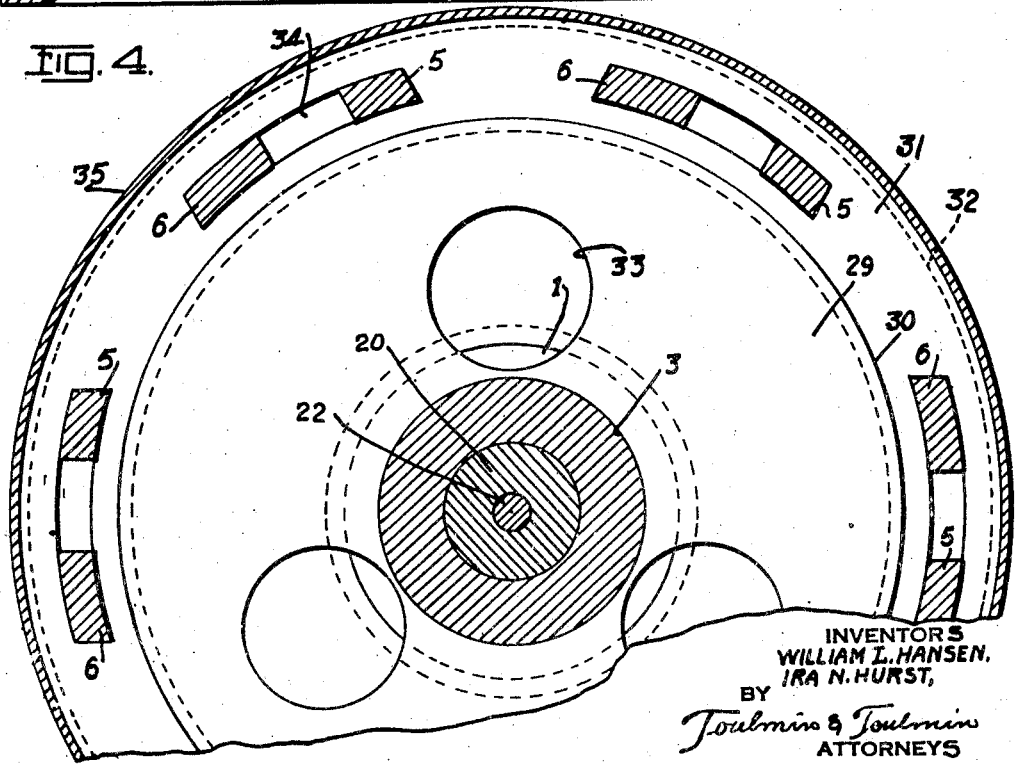
INVENTORS
WILLIAM L. HANSEN,
IRA N. HURST,
BY
Toulmin & Toulmin
ATTORNEYS Patented Oct. 12, 1948

2,450,955

UNITED STATES PATENT OFFICE 2,450,955

SYNCHRONOUS MOTOR

William L. Hansen and Ira N. Hurst, Princeton, Ind., assignors to Hansen Mfg. Company, Princeton, Ind., a corporation of Indiana Application July 31, 1947, Serial No. 765,110

6 Claims. (Cl. 172—278)

This invention relates to electric motors and in particular to electrical synchronous motors such as are employed for operating clocks and for performing other small duty work.

In the type of motor to which this invention particularly applies, axial or outer pole pieces are employed which surround the field coil. These pole pieces form part of a magnetic field member which is mounted at one end on a core which receives the field coil. A second magnetic field member is mounted on the other end of the core and is provided with inner or lateral pole pieces disposed radially with their tips spaced from the tips of the axial pole pieces to leave a continuous annular opening between pole tips. A rotor is positioned within this annular opening. In order to provide a rotating magnetic field, one set and preferably both sets of pole pieces, are shaded by the use of undulating rings of non-magnetic metal. A motor of this general type is shown and described in the Hansen and Hurst Patents Nos. 2,256,711 and 2,298,373 patented September 23, 1941, and October 13, 1942, respectively.

Various problems are involved in the assembly and operation of a motor of this character. The annular space or magnetic gap between pole tips is not only of critical width but also must have a strictly concentric relation with respect to the axis of the motor in order to receive with close tolerance the rotor. During the manufacture and assembly there is a tendency for one or more of the pole pieces to spring out of shape or position, particularly when the shading ring or rings are being applied. The result is that the annular gap between the pole tips may not be of uniform width throughout the entire length of the gap and the operating efficiency of the motor might therefore decrease due to the variation of the field throughout the magnetic path.

The general object of the invention is to provide a synchronous motor in which the annular interpole space is strictly of a pre-determined width throughout its length so that the intensity of the magnetic field at the gap remains constant.

Another object is to provide an improved type of synchronous motor and more particularly an improvement in the manufacture and assembly of the motor by which the cooperating pole pieces are maintained strictly in concentric relation with respect to the central axis of the motor.

The above objects are attained, in brief, by providing a cup shaped element which is fixed in a central position with respect to the axis of the motor and has a plurality of openings about its periphery for snugly receiving the axial pole pieces, thereby to constrain these members to a strictly concentric position with respect to the axis of the motor. The invention will be better understood when reference is made to the following description and the accompanying drawings in which:

Figure 3 is a vertical section, somewhat enlarged, of the motor shown in Fig. 1 but mounted on a base and with the pole-locating accessory in position.

Figure 4 represents a sectional view taken along line 4—4 in Fig. 3.

Figure 1:
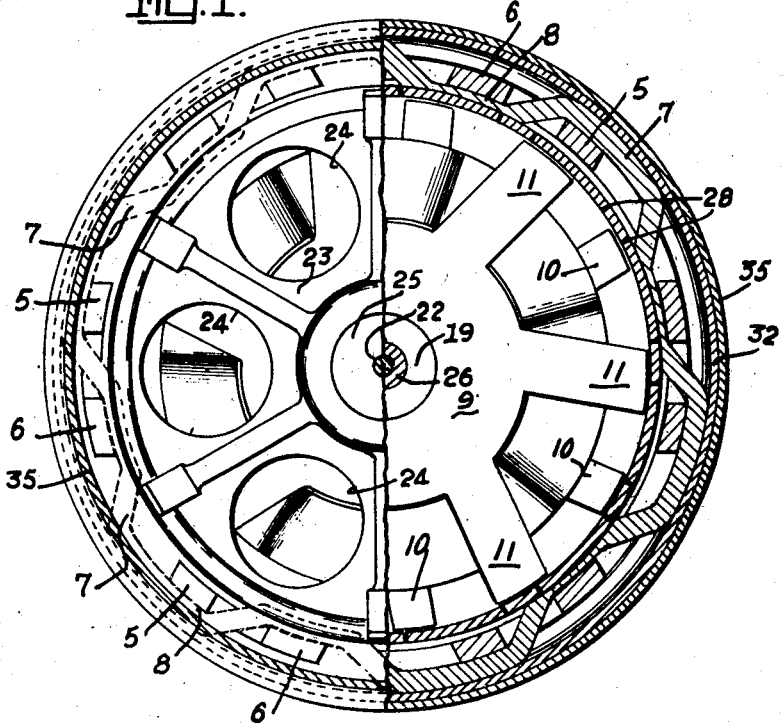
Figure 1 represents a partial plan and a partial transverse sectional view of a synchronous motor having axial pole pieces and to which the present invention applies. This view is taken at approximately the position indicated by line I—I in Fig. 3 but Fig. 1 is of smaller size than Fig. 3.

Referring to the drawings in detail, numeral I (Fig. 3) designates a magnetic tubular hub having reduced diameter portions 2, 3 and upon which are mounted the outer and inner field pole assemblies. The outer field pole structure consists of a disc 4 having an aperture by which it is mounted on the reduced diameter portion 2 of the hub I and having axially directed pole pieces 5, 6 disposed alternatingly in a cylindrical path around the hub I. The pole pieces 5, 6 are preferably not equidistantly spaced about the disc 4 but instead are arranged in pairs around the periphery of the disc as can best be seen in Fig. 4.

The alternating pole pieces 5, 6 are shaded by an undulating ring 7 of nonmagnetic material such as copper. This undulating ring passes over the outer surfaces of the pole pieces 5 and therefore does not shade them. The ring 7, however, is provided with undulating portions 8 passing around three sides of the pole pieces 6 thereby shading these pole pieces and providing a phase lag when the field structure is magnetized by an alternating flux.

The inner pole piece assembly consists of a pair of discs 9, 12 having apertures by which they are mounted on the reduced diameter portion 3 of the hub I. The discs are provided with pole pieces 10, 11 respectively which extend practically radially from the discs and when assembled on top of one another, the pole pieces 10 of one disc form a plurality of pairs of pole pieces with the pole pieces 11 of the other disc around the periphery of the assembled discs. The pole pieces 10, 11 do not extend as far as the pole pieces 5, 6 but instead are cut short so as to leave an annular space between the tips of the pole pieces 10, 11 and the inner peripheral surface of the pole pieces 5, 6; the width of this annular space is such as to accommodate the thickness of a rotor. The disc 12 is spaced from the shoulder formed by the reduced diameter portion 3 by a cup shaped element 13 which will be described in detail hereinafter, this element being mounted on portion 3 of the tubular hub.

The pole pieces 10 may be bent downwardly while the pole pieces 11 are bent upwardly so that their ends, looking toward the periphery, are in substantially the same plane. An undulating ring 14 of non-magnetic metal such as copper is interposed between the discs 9, 12 at the position of the pole pieces. This shading ring has undulating portions passing around three sides of each of the pole pieces 11 so as to shade them. However, the ring 12 merely passes across the front of the face of each pole piece 10 and therefore does not shade it. As can be seen on the drawings, the shading ring has considerable width measured in the radial direction so that the pole pieces 10, 11 are likewise of considerable length in order to accommodate the shading ring.

The field structure formed by the radial pole pieces 10, 11 and the axial pole pieces 5, 6 is magnetized by a field coil 15 wound on a drum 16 of insulating material and contained between a pair of insulating webs 17. The drum 16 is mounted on the hub 1 and secured thereto in any suitable and well known manner. There are a pair of leads (not shown) connected to opposite ends of the coil 15 and adapted to be connected to a suitable source of alternating current. The magnetic hub is provided with an axial bore 18 closed at each end by the plug washers 19 seated in recesses at the hub and abutting several inner washers 20 mounted at the ends of a sleeve 21. The washers 19 have an opening at the center for receiving the shaft 22 of a rotating disc 23 made of a light metal such as aluminum and provided with a number of equidistantly spaced large openings 24. The disc 23 is secured to the shaft 22 by means of a hub member 25 having a downwardly extending collar 26 which bears against the upper washer 19. The space within the bore between the shaft and the inner washers 20 and sleeve 21 may be filled with a liquid lubricant or with waste saturated with a lubricant.

The rotor band 27 is provided with circumferentially spaced incisions 28 indicated in Fig. 1, preferably as many as there are pairs of poles and equidistantly spaced incisions serve to interrupt the magnetic path and in this manner to provide poles around the rotor band. The width of the rotor band 27 should preferably be greater than the thickness of the radial or inner pole pieces 10, 11 as shown in Fig. 3. It should also be noted in this figure that the axial pole pieces 5, 6 extend for a short distance beyond the upper surfaces of the radial pole pieces 10, 11.

In the fabrication of the improved motor, the first step is to mount the coil 15 on the hub after which the disc 4 is placed in position on the hub. The shading ring 7 is then pressed downwardly about the cylindrical path of the axial pole pieces, causing the undulations 8 closely to embrace the wider pole pieces 6 as can be seen in Fig. 1. The next step is to apply the disc 12 to the hub 1 with the pole pieces 10 bent upwardly and positioned angularly with respect to the axial pole pieces. The shading ring 14 is then placed over the disc 12 and rotated slightly to cause the pole pieces 10 to fit into the upstanding undulations of the ring. Finally, the disc 9 is placed over the shading ring 14 with the pole pieces 11 extending downwardly so as to fit snugly into the downwardly extending undulations of the ring 14. Assuming that the pole pieces 10 have been properly positioned with respect to the pole pieces 5, 6, the pole pieces 11 will automatically take the position shown in Fig. 1 with respect to the axial pole pieces. The field circuit is then complete.

It has been found that when the shading ring 7 is being applied to the pole pieces 5, 6 there is a tendency to bend inwardly, even though slightly, any one or more of the axial pole pieces 5, 6. Obviously, the leverage applied to the upper ends of the pole pieces 5, 6 about the positions where it joins the disc 4 is considerable so that it may not require much force to bend the axial pole pieces slightly out of cylindrical alignment. The direct effect is to vary the width of the annular space between a pair of pole pieces 10, 11 and its immediately adjacent pair 5, 6 and the magnetic flux moving from one pair of pole pieces to the other and intercepted by the rotor band 27 obviously varies. This variation in flux in the travel path of the rotor tends to introduce variations in the rotary effort of the rotor and in an exaggerated case, as when an axial pole piece is bent considerably inward, the resulting friction on the rotor may be sufficient to prevent rotation.

Figure 2:
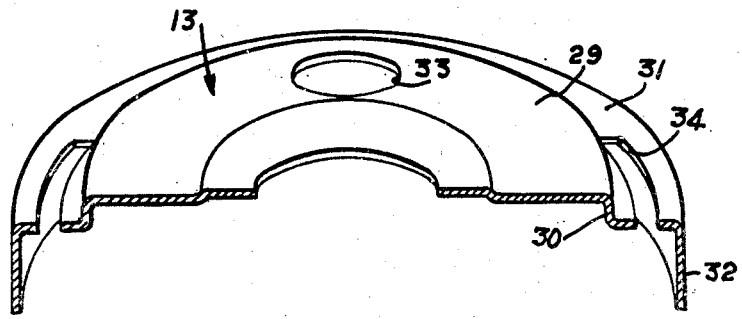
Figure 2 is a perspective view of a portion of an improved cup shaped member or accessory which may be employed to hold the axial pole pieces strictly in place.

This invention has for its main object the maintenance of the proper position of these axial pole pieces during manufacture and assembly of the motor and throughout the operating life. For this purpose and as shown in Figs. 2, 3 and 4, I employ a cup shaped member 13 which has the central opening tightly fitted about the portion 3 of the tubular hub 1. Non-magnetic material such as fiber, specially treated cardboard, thermosetting plastic or any other material that lends itself to a pressing operation and rigidly retains its shape even under slight amount of heat, may be used. Non-magnetic metal such as aluminum and copper may also be used for this purpose although we prefer to employ non-metal materials to minimize cost. The member is provided with a base portion indicated at 29 and a downwardly extending flange portion 30 which merges into a flat peripheral portion 31. The latter is also formed at its outer extremity with a fairly deep flange 32. A plurality of large holes indicated at 33 may be provided in the base portion 29 to reduce weight and a series of openings 34 may be provided in the flat portion 31 for snugly receiving each pair of the axial pole pieces 5, 6. These openings are of an annular slot-like character and each opening is adapted to receive one pair of the axial pole pieces.

The cup shaped member 13 is applied to the tubular element 1, directly on top of the upper web 17 before the disc 12 and shading ring 14 are placed in position. It is therefore a simple matter to cause the axial pole pieces 5, 6 to enter the openings 34 and then by pressing the member 13 still downwardly, the central opening in the member can be forced over portion 3 of the tubular element. Thus the axial pole pieces are held rigidly in position by this cup shaped element 13 and these pole pieces can move neither outwardly nor inwardly in the radial direction during the subsequent manufacturing or assembly operations on the motor. Due to the end positions that the pole pieces assume, within the slots, no outward movement of the pole pieces is possible. If desired, separate slots for each pole piece may be employed which would hold these elements rigidly in four directions. With the member 13 in place, the two pole piece discs 12, 9 and the shading ring 14 can be applied to the tubular member 1, and if desired, the metal of the discs may be peened to the hub to hold the parts together.

In order further to offer protection to the pole pieces and the working parts of the motor, we may provide a non-magnetic shield 35 of any suitable shape to fit snugly over the outside periphery of the member 13, also over the upper edge of the pole pieces 5, 6 and in addition over the entire upper surface of the rotor. In order to adapt the motor to a clock mechanism, the lower portion 2 of the hub 1 may be received in an opening 36 of a metal case 37 which contains gearing of any suitable type which is connected through a pinion (not shown) affixed to the shaft 22.

From the foregoing it is evident that we have provided an accessory in the form of a cup-shaped member 13 which strictly locates the axial pole pieces 5, 6 in the vertical direction due to the annular shape of the openings 34, and their predetermined distance from the center of the motor. In addition, the end surfaces of the openings 34 position these pole pieces in the endwise direction to assure that the pole pieces of each pair will not move outwardly with respect to one another. Thus the axial pole pieces are maintained rigidly in position withstanding any tendency to move the same when the shading ring 7 is mounted on the pole pieces or any other force is acting to distant the pole pieces from their correct position.

The latter, together with the radial pole pieces 10, 11, are therefore caused to be spaced a predetermined distance apart so that the rotor element 27 will be subjected to the same flux intensity throughout its travel in the inter-pole annular space. The use of the pole-retaining member 13 does not greatly increase the cost of the motor since this member can be cheaply made on standard presses and no special provision is necessary to hold the member in axial position because the pole pieces 10, 11 bear against the member 13 and are peened to the hub.

Having thus fully described our invention what we claim as new and desire to secure by Letters Patent is:

1. In a synchronous motor, a magnetic core, a coil surrounding said core, a magnetic field member mounted on one end of said core and having outer pole pieces disposed axially in a substantially cylindrical path, a second magnetic field member mounted on the other end of said core and having inner pole pieces disposed radially with their tips spaced from the tips of the axial pole pieces to leave a continuous annular opening between the pole tips, a rotor positioned within said annular opening, and a shading ring positioned adjacent to and intertwining said outer pole pieces and arranged to shade alternate outer pole pieces, and means mounted on said core between said second magnetic field member and said coil for maintaining said outer pole pieces rigidly in position with respect to the inner pole pieces.

2. In a synchronous motor, a magnetic core, a coil surrounding said core, a magnetic field member mounted on one end of said core and having outer pole pieces disposed axially in a substantially cylindrical path, a second magnetic field member mounted on the other end of said core and having inner pole pieces disposed radially with their tips spaced from the tips of the axial pole pieces to leave a continuous annular opening between the pole tips, a rotor positioned within said annular opening, and a shading ring positioned adjacent to and intertwining said outer pole pieces and arranged to shade alternate pole pieces, and means mounted on said core between said second magnetic field member and said core for constraining the outer pole pieces to said cylindrical path, the central axis of which coincides with the axis of the motor.

3. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips spaced from the tips of the axial pole pieces to leave a continuous annular opening between the pole tips, a rotor positioned within said annular opening, and a shading ring positioned adjacent to and intertwining said outer pole pieces and arranged to shade alternate outer pole pieces, said means comprising a cup shaped member which fits about the central core of the motor and is provided with openings for snugly receiving said axial pole pieces.

4. In a synchronous motor, a magnetic core, a coil surrounding said core, a magnetic field member mounted on one end of said core and having outer pole pieces disposed axially in a substantially cylindrical path, said pole pieces being arranged in pairs with a greater annular distance between pairs than between the pole pieces of each pair, a second magnetic field member mounted on the other end of said core and having inner pole pieces disposed radially with their tips spaced from the tips of the axial pole pieces to leave a continuous annular opening between the pole tips, said inner pole pieces being arranged in pairs with a greater annular distance between pairs than between the pole pieces of each pair, a rotor positioned in said annular opening, means for producing a magnetic field in said field members, and means carried on said core interposed between said second magnetic field member and said coil for maintaining the outer pole pieces in circular alignment with one another in order that the annular opening between pole tips shall be of uniform size throughout its entire length.

5. In a synchronous motor, a magnetic core, a magnetic field member mounted on one end of the core and having a flat portion which extends radially from the core and terminates in a plurality of outer pole pieces extending at right angles to said flat portion, said outer pole pieces being disposed axially in a substantially cylindrical path about said core, a second magnetic field member mounted on the other end of said core and including a flat portion which terminates in a plurality of inner pole pieces extending radially from said core but stopping short of said outer pole pieces so as to leave a continuous annular opening between the pole tips, a rotor positioned within said annular opening, an energizing coil wound on said core and positioned between the flat portions of said magnetic field members, and means for maintaining the outer pole pieces rigidly in position with respect to the inner pole pieces, said means comprising a cup shaped member which is interposed between one of the flat surfaces of said magnetic field members and one end of the coil, said cup shaped member being provided with a plurality of openings arranged in predetermined positions for snugly receiving the outer pole pieces and thereby restraining any movement of these pole pieces away from the said cylindrical path.

6. In a synchronous motor, a magnetic core, a magnetic field member mounted at one end of said core and having a flat portion extending radially from said core and terminating in a plurality of outer pole pieces which are bent approximately 90° from said flat portion and are arranged in a substantially cylindrical formation, a second magnetic field member mounted on the other end of said core and having a flat portion which terminates in a plurality of inner pole pieces extending radially from the core but stopping short of said outer pole pieces to leave a continuous annular opening between pole tips, a rotor positioned within said annular opening, a shading ring positioned adjacent to and intertwining said outer pole pieces and arranged to shade alternate outer pole pieces, an energizing coil wound about said core and positioned between the flat surfaces of said magnetic field members, and means for maintaining said outer pole pieces rigidly in position with respect to the inner pole pieces, said means including a cup shaped member positioned between one of said flat surfaces of the magnetic field members and said coil, said cup shaped member having a plurality of openings for snugly receiving the outer pole pieces to hold them within said cylindrical path, said cup shaped member also having a flange which fits snugly about outer portions of said shading ring.

WILLIAM L. HANSEN.
IRA N. HURST.

REFERENCES CITED

The following references are of record in the file of this patent:

UNITED STATES PATENTS

| Number | Name | Date |
|---|---|---|
| 2,049,261 | Haydon | July 28, 1936 |
| 2,080,371 | Hammond | May 11, 1937 |
| 2,256,711 | Hansen et al. | Sept. 23, 1941 |
| 2,298,373 | Hansen et al. | Oct. 13, 1942 |
| 2,424,020 | Chatelain | July 15, 1947 |

FOREIGN PATENTS

| Number | Country | Date |
|---|---|---|
| 477,835 | Great Britain | Jan. 3, 1938 |